(12) United States Patent
Tanaka

(10) Patent No.: US 8,204,644 B2
(45) Date of Patent: Jun. 19, 2012

(54) VEHICLE COMMUNICATION APPARATUS

(75) Inventor: Yukiomi Tanaka, Takahama (JP)

(73) Assignee: Denso Corporation, Kariya (JP)

( * ) Notice: Subject to any disclaimer, the term of this patent is extended or adjusted under 35 U.S.C. 154(b) by 267 days.

(21) Appl. No.: 12/660,627

(22) Filed: Mar. 2, 2010

(65) Prior Publication Data

US 2010/0228425 A1 Sep. 9, 2010

(30) Foreign Application Priority Data

Mar. 5, 2009 (JP) ................................ 2009-052455

(51) Int. Cl.
G01M 17/00 (2006.01)

(52) U.S. Cl. ..................................... 701/29.1

(58) Field of Classification Search ................ 701/29.1, 701/36, 99, 408
See application file for complete search history.

(56) References Cited

U.S. PATENT DOCUMENTS

| | | | |
|---|---|---|---|
| 5,796,178 A | 8/1998 | Onuma | |
| 6,476,714 B2 * | 11/2002 | Mizuta | 340/461 |
| 7,315,236 B2 | 1/2008 | Yanagida et al. | |
| 2005/0060067 A1 * | 3/2005 | Nishida | 701/2 |

FOREIGN PATENT DOCUMENTS

| | | |
|---|---|---|
| JP | 09-240429 | 9/1997 |
| JP | 2003-112606 | 4/2003 |
| JP | 2003-182525 | 7/2003 |
| JP | 2003-312395 | 11/2003 |
| JP | 2004-013534 | 1/2004 |

* cited by examiner

Primary Examiner — Kim T Nguyen
(74) Attorney, Agent, or Firm — Harness, Dickey & Pierce, PLC

(57) ABSTRACT

A vehicle communication apparatus has a main battery, and the main battery is switched to a supplemental battery when voltage of the main battery falls to a second threshold. Further, prior to voltage fall of the main battery to the second threshold, vehicle information at least including position of a vehicle is prepared for transmission from a report unit. By adapting the above voltage monitoring scheme, the removal of the main battery is appropriately detected, and the position information of the vehicle is appropriately reported wirelessly to an information center by the report unit, and working time of the report unit that is operated by the supplemental battery is extended without increasing the capacity of the supplemental battery.

5 Claims, 5 Drawing Sheets

VEHICLE COMMUNICATION APPARATUS

CROSS REFERENCE TO RELATED APPLICATION

The present application is based on and claims the benefit of priority of Japanese Patent Application No. 2009-52455, filed on Mar. 5, 2009, the disclosure of which is incorporated herein by reference.

FIELD OF THE INVENTION

The present disclosure generally relates to an in-vehicle wireless communication apparatus.

BACKGROUND INFORMATION

An example of conventional in-vehicle wireless communication apparatus that reports (a) the stop of power supply from a vehicle battery and (b) the switch of the vehicle battery to a supplemental battery is disclosed in, for example, Japanese patent document 1 JP-A-2003-112606. This apparatus serves as a theft prevention apparatus.

The above theft prevention apparatus monitors, in a theft monitor mode that is set by a monitor setting switch, power voltage of the vehicle battery by a power controller, and switches the vehicle battery to the supplemental battery when the power supply from the vehicle battery stops, with an output of a report signal that reports the switching of the battery. Then, the power controller determines the theft of the vehicle upon detecting the switching to the supplemental battery, while maintaining the operation of the theft prevention apparatus by using the supplemental battery, and performs a theft report process. In this manner, the theft of the vehicle by a thief who disconnects the vehicle battery for preventing the theft report is securely warned and prevented.

Japanese Patent Laid-Open No. 2003-112606 bulletin (Japanese patent document 1)

As observed above, the theft prevention measure is intended and expected to operate as a longer a time as possible. Therefore, one possible solution for the extended operation time is carrying a large capacity battery. However, the large capacity battery occupies a large volume, which leads to an increase of the volume of the wireless communication apparatus. The increase of the apparatus volume makes it difficult for the apparatus to fit in a limited installation space in the vehicle.

SUMMARY OF THE INVENTION

In view of the above and other problems, the present disclosure provides a vehicle communication apparatus that has an extended operation time with using the supplemental battery without increasing the apparatus volume.

In an aspect of the disclosure, a vehicle communication apparatus for use in a vehicle with a power supply from a vehicle battery includes: a position acquisition unit for acquiring a vehicle position; a voltage monitor for monitoring a voltage of the vehicle battery; a supplemental battery for supplying power in place of the vehicle battery; a check unit for checking if the vehicle battery is removed upon detecting that the voltage of the battery reaches a threshold; a power switch unit for switching the power supply from the vehicle battery to the power supply from the supplemental battery when the check unit determines that the vehicle battery is removed; a report unit for transmitting, to an outside of the vehicle, an information report that at least includes the vehicle position when the check unit determines that the vehicle battery is removed; and a preparation unit for preparing the report information that is to be transmitted by the report unit when the voltage of the vehicle battery decreases to a preparation value that is higher than the threshold.

Due to the preparation of the vehicle information to be transmitted before the power supply is switched to the supplemental battery, that is, while the power is supplied from the vehicle battery, consumption of the supplemental battery is suppressed. Therefore, the reporting time to report, for example, the theft of the vehicle from the vehicle communication apparatus by the report unit can be extended without increasing the capacity of the supplemental battery.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
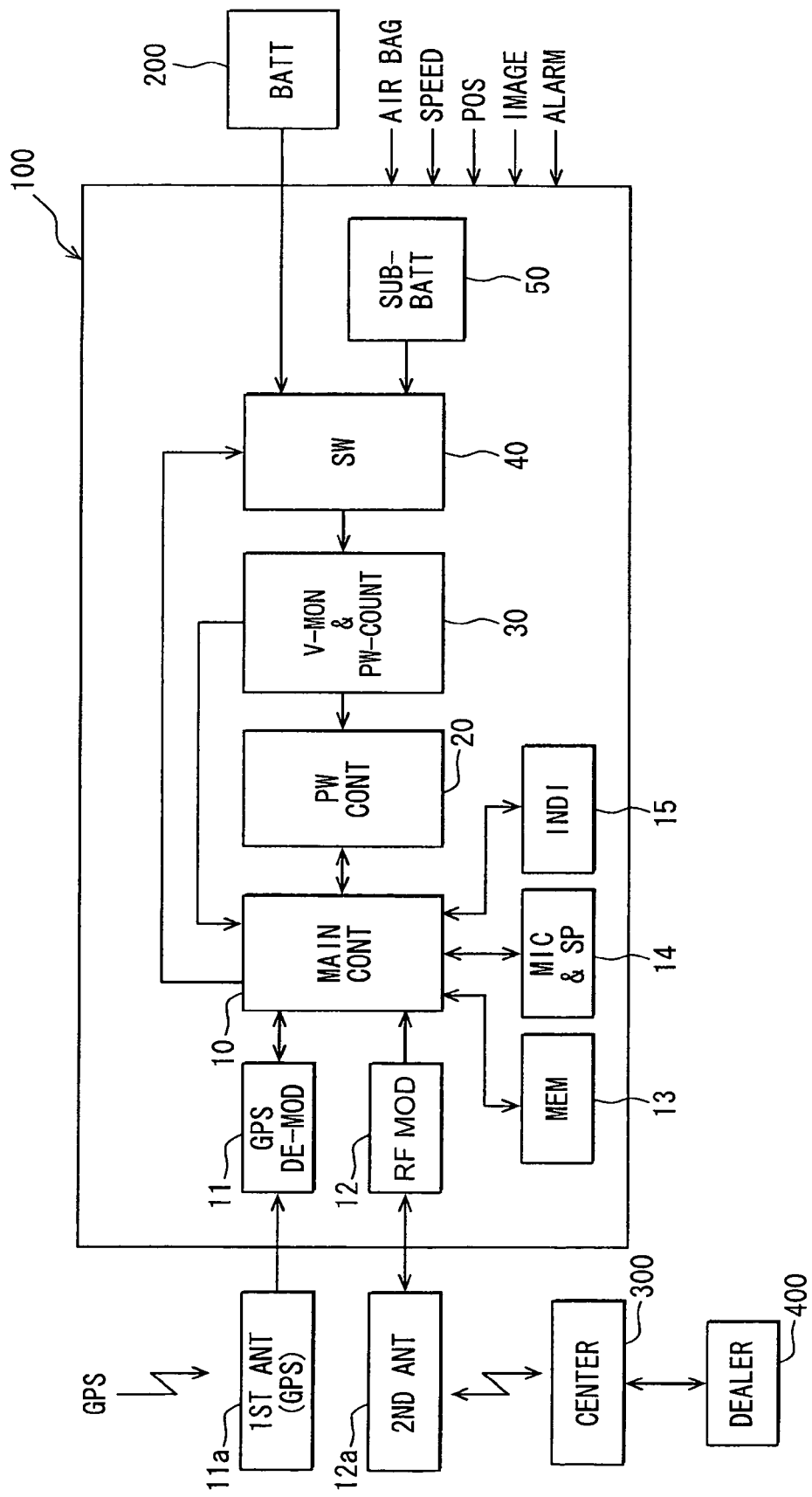
FIG. 1 is a block diagram showing an outline configuration of the in-vehicle wireless communication apparatus in an embodiment of the present invention.

An embodiment of the present disclosure is explained in the following with reference to the drawings.

An in-vehicle wireless communication apparatus 100 determines theft of the vehicle when, for example, (a) a theft is detected when the vehicle is parked (i.e., while the engine is stopping), or (b) the power supply from a main battery (a vehicle battery in claims) 200 of the vehicle is stopped. The apparatus 100 then performs a theft warning from a speaker 14, an indicator 15, and reports the theft of the vehicle to a management center or the like from an RF modulation demodulation unit 12 and a second antenna 12a.

The in-vehicle wireless communication apparatus 100 consists mainly of a microcomputer having a CPU, a memory, an 10 interface as shown in FIG. 1, and includes a main control unit 10, a power supply control unit 20, a voltage monitor/electric current counter unit (a monitoring unit in claims) 30, a power supply switching circuit 40 and a supplemental battery 50. In addition, the in-vehicle wireless communication apparatus 100 operates on the power supply from the main battery 200. If, however, the main battery 200 is removed from the vehicle, the apparatus 100 operates on the power supply from the supplemental battery 50, which will be described later in the specification. Furthermore, the in-vehicle wireless communication apparatus 100 is connected to an air bag device, a vehicle speed sensor, a navigation apparatus, an in-vehicle camera, a gyro sensor and the like (all of which not illustrated). Those devices input various signals such as an air bag development signal, a vehicle speed pulse, position information, a camera image, an alarm signal, to the in-vehicle wireless communication apparatus 100.

The main control unit 10 is connected to the power supply control unit 20, the monitoring unit 30, the power supply switching circuit 40, a GPS demodulation unit 11, the RF modulation demodulation unit 12, a memory unit 13, a microphone speaker 14; the indicator 15 and the like. For example, the main control unit 10 performs, based on an input signal, transmission preparation and transmission instructions of vehicle information (i.e., position information), power supply switch instruction, warning instructions to the microphone speaker 14 and the indicator 15.

In addition, the main control unit 10 performs, for example, theft detection based on the position information, an alarm signal, a vehicle speed pulse and the like. In other words, the main control unit 10 monitors the position information from the GPS demodulation unit 11, monitors the angular velocity information (an alarm signal) from the gyro sensor, monitors the vehicle speed pulse (wheel revolution number information) from the vehicle speed sensor, as well as monitoring a condition of an immobilizer (not illustrated), a key cylinder (not illustrated), and an engine ECU (not illustrated). Further, when the position information, the angular velocity information, or a vehicle speed pulse indicating a vehicle speed above a threshold is input, or when loss of power supply from the main battery 200 is detected, the vehicle theft is determined.

Figure 2:
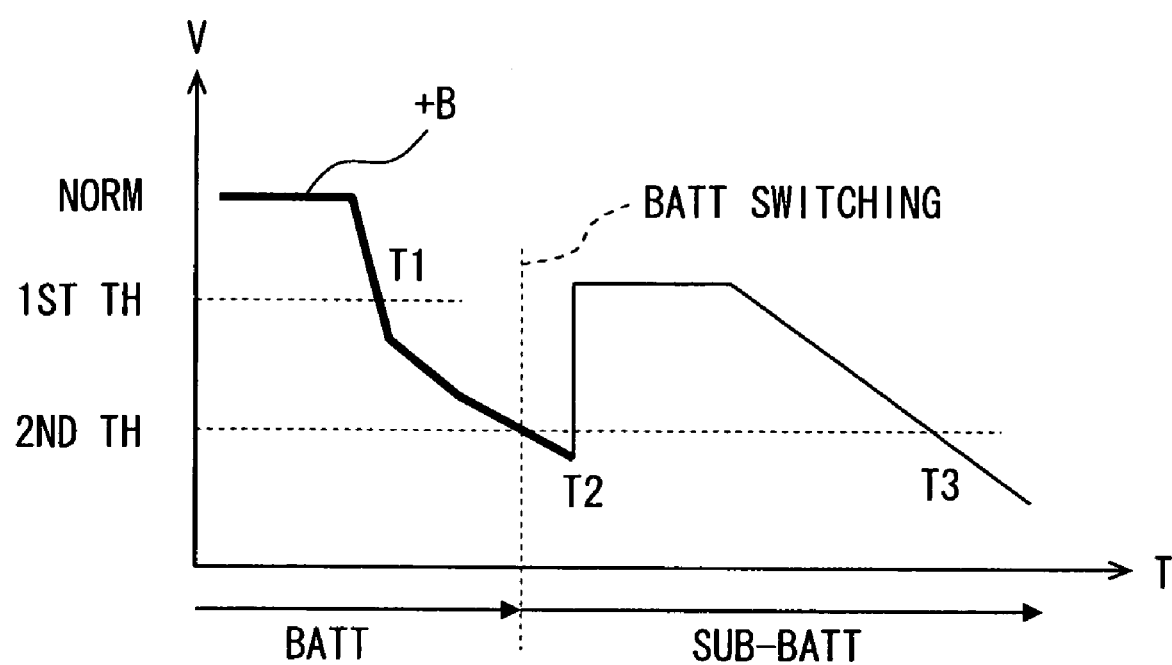
FIG. 2 is a graph showing a switch timing from a main battery to a supplemental battery in the in-vehicle wireless communication apparatus.

The main control unit 10 determines loss of the power supply from the main battery 200 when the voltage of the main battery 200 falls to a second threshold (a threshold in claims) in a short period of time (for example, in two seconds) as shown in FIG. 2. Then, upon detecting the voltage fall to the second threshold, the main control unit 10 instructs to send the vehicle information, and instructs to switch power supply. The second threshold is assumed to be a voltage of 5 V, for example, which enables the power supply switching circuit 40 to switch from the main battery 200 to the supplemental battery 50. In other words, the second threshold is a minimum voltage that enables the operation of the in-vehicle wireless communication apparatus 100, and that does not allow the engine to start.

In addition, the main control unit 10 predicts, as shown in FIG. 2, the removal of the main battery 200 when the voltage of the main battery 200 falls to a first threshold (a preparation value in claims) in a short time (for example, in one second). Then, the main control unit 10 instructs preparation of the transmission of the vehicle information including the position information when the voltage of the main battery 200 falls to the first threshold. The first threshold is a minimum voltage that enables the operation of the in-vehicle wireless communication apparatus 100, and that does not allow the engine to start, which is a voltage of 7 V; for example.

The vehicle information includes, besides the position information, battery voltage drop information, an alarm signal, the camera image, and the like. The transmission preparation of the vehicle information means that the vehicle information is stored temporarily in a register (not illustrated) in the main control unit 10.

A first antenna 11a is a GPS antenna, and receives an electric wave transmitted by the global positioning system (GPS) satellite, and outputs it to the GPS demodulation unit 11. The GPS demodulation unit 11 demodulates a GPS signal acquired from the first antenna 11a, determines the position of the vehicle, and outputs the position information that indicates the position of the vehicle to the main control unit 10 (a positioning unit in claims). In addition, the main control unit 10 may acquire the positioning error by, for example, acquiring position correction data by the differential GPS method that utilizes the FM multiplex broadcasting, and by calculating the positioning error of the GPS demodulation unit 11 and the first antenna 11a (an error acquisition unit in claims).

A second antenna 12a receives an electric wave transmitted through a mobile telephone network, and outputs it to the RF modulation demodulation unit 12. The RF modulation demodulation unit 12 demodulates a signal acquired from the second antenna 12a, and outputs the demodulated signal to the main control unit 10. In turn, the signal output from the main control unit 10 is transmitted from the second antenna 12a to the telephone network after the modulation by the RF modulation demodulation unit 12. In addition, the signal transmitted from the RF modulation demodulation unit 12 and the second antenna 12a is the vehicle information and other information, which includes the position information indicative of the vehicle position to be transmitted as a theft report.

The memory unit 13 records the information such as the position information, battery voltage drop information, an alarm signal, the camera image according to record instructions from the main control unit 10. In addition, the memory unit 13 outputs the information according to a read request from the main control unit 10.

The power supply control unit 20 converts the voltage of the main battery 200 and the voltage of supplemental battery 50 to the operation voltage of internal circuits of the in-vehicle wireless communication apparatus 100 such as the main control unit 10, the power supply control unit 20, the monitoring unit 30, the power supply switching circuit 40 as well as peripheral devices such as the GPS demodulation unit 11, the RF modulation demodulation unit 12, the memory unit 13, the microphone speaker 14, and the indicator 15, for the purpose of power supply.

The monitoring unit 30 monitors the voltage of the main battery 200, and outputs to the main control unit 10 a signal indicative of the monitored voltage when the vehicle is parked (i.e., while the engine is stopped). Further, when the main battery 200 is switched to the supplemental battery 50, the consumed current from the supplemental battery 50 is accumulated to calculate an accumulated consumption of electric current that is to be output to the main control unit 10 as a signal. The power supply switching circuit 40 switches, based on a signal showing a switching instruction from the main control unit 10, power supply for the in-vehicle wireless communication apparatus 100 from the main battery 200 to the supplemental battery 50.

When the power supply from the main battery 200 is cut off (i.e., when the main battery 200 is removed), the supplemental battery 50 is used to supply power to the apparatus 100 and the peripheral devices in place of the main battery 200. The supplemental battery 50 may be a rechargeable battery (i.e., a secondary battery) or a primary battery that is not rechargeable. The main battery 200 supplies a power to entire electric system in the vehicle, besides supplying a power to the in-vehicle wireless communication apparatus 100 and its peripheral devices. The supplemental battery 50 is pre-disposed in the vehicle for use in the vehicle.

The management center 300 is connectable to the in-vehicle wireless communication apparatus 100 through wireless communication, and the staff in the center 300 recognizes the theft of the vehicle when the theft report is transmitted from a pre-registered vehicle. In addition, the management center 300 is connectable to dealers and other stores 400. Therefore, the staff in the center 300 can contact the dealer and stores 400 upon recognizing the theft of the vehicle. Further, the center 300 and the dealer 400 can track the stolen vehicle by receiving the position information transmitted from the in-vehicle wireless communication apparatus 100.

Figure 3:
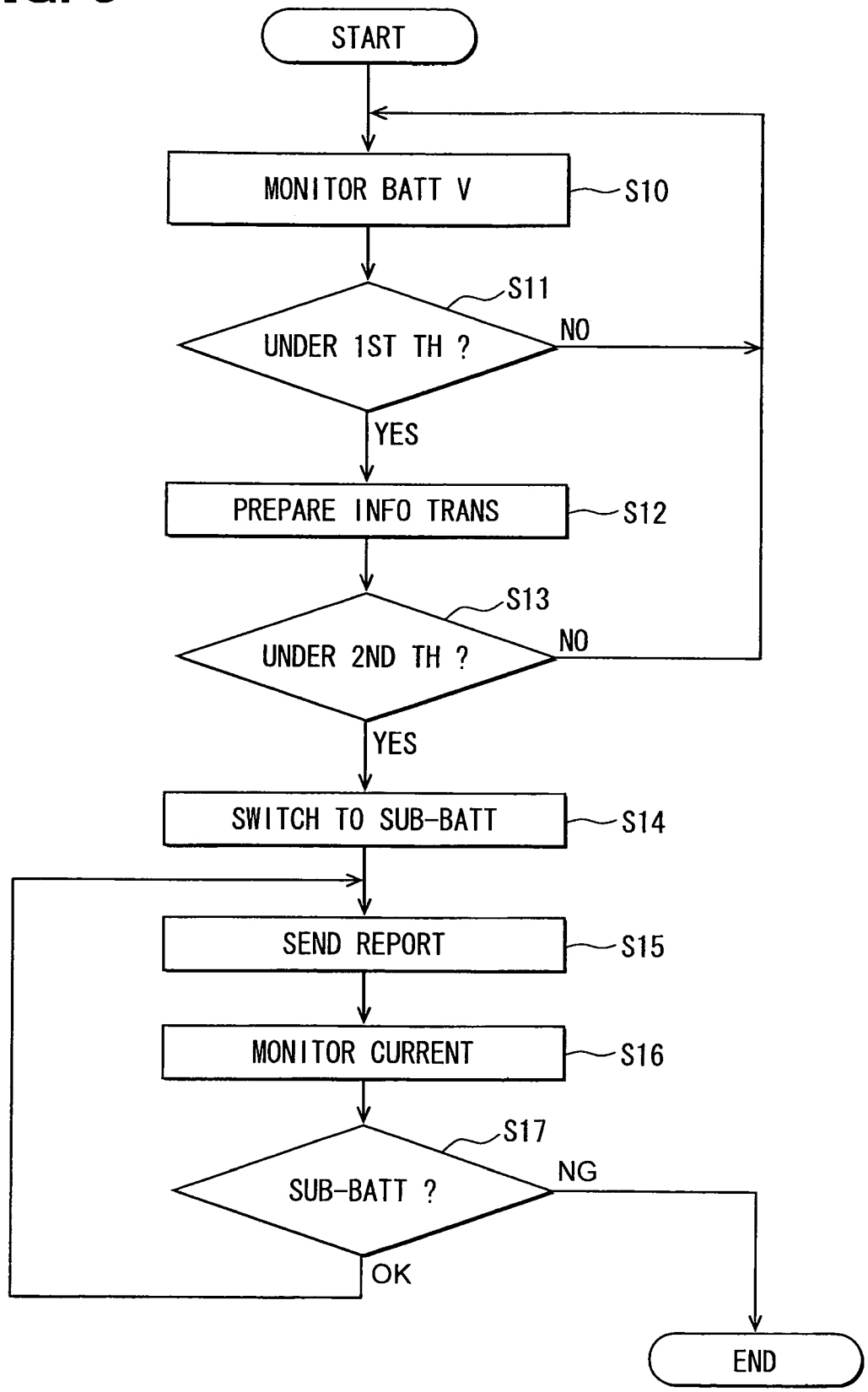
FIG. 3 is a flowchart of a process in the in-vehicle wireless communication apparatus.

With reference to FIG. 3, the process in the in-vehicle wireless communication apparatus is described. The process shown in FIG. 3 is repeated at a predetermined interval while the vehicle is parked (while the engine is stopped).

In step S10, the monitoring unit 30 monitors the voltage of the main battery 200, and a signal showing the voltage is output to the main control unit 10 (a voltage monitor in claims).

In step S11, the main control unit 10 determines whether the voltage of the main battery (+B) has fallen to the first threshold (a preparation value in, claims) or below in a short time, the first threshold higher than the second threshold (a threshold in claims) (at T1 in FIG. 2). Then, if it is the case, the process proceeds to S12. If it is not the case, the process returns to S10.

In step S12, the main control unit 10 prepares for the transmission of the vehicle information (including the position information showing the position of the vehicle derived from the GPS demodulation unit 11 or the navigation apparatus) (a preparation unit in claims). That is, in other words, the main control unit 10 acquires the information such as the battery voltage drop information, an alarm signal, the camera image and the like together with the position information showing the position of the vehicle (a position acquisition unit in claims) from the GPS demodulation unit 11 or the navigation apparatus, and stores the vehicle information including these information in a register (T1 to T2 in FIG. 2).

By preparing the vehicle information to be transmitted before switching from the main battery 200 to the supplemental battery 50, the consumption of the supplemental battery 50 is prevented. Therefore, working time (i.e., a reporting time) of the battery 50 can be extended without increasing its capacity. As a result, the stolen vehicle can be tracked for an extended period of time.

In step S13, the main control unit 10 determines whether the battery voltage has fallen to the second threshold (a threshold in claims) or below in a short time (at T2 in FIG. 2), for the purpose of determining if the main battery 200 is removed. If it is the case, the process proceeds to S14 determining that the battery 200 is removed. If it is not the case, the process returns to S10 (a check unit in claims).

When it is determined that the main battery 200 is removed, the main control unit 10 outputs a signal showing the switching instruction of the power supply in S14 to the power supply switching circuit 40. The power supply switching circuit 40 acquiring this signal switches the power supply for the in-vehicle wireless communication apparatus 100 from the main battery 200 to supplemental battery 50 (a power switch unit in claims). Furthermore, the main control unit 10 performs reporting, in step S15, by transmitting the vehicle information stored in the register to an outside of the vehicle from the RF modulation demodulation unit 12 and the second antenna 12*a* (a report unit in claims).

In this case, the RF modulation demodulation unit 12 does not receive power supply from the supplemental battery 50 except for a time of transmitting the vehicle information. Further, when the vehicle information is transmitted, the main control unit 10 transmits, to the power supply control unit 20, a signal showing that the power is supplied to the RF modulation demodulation unit 12. In this manner, the RF modulation demodulation unit 12 is enabled to transmit the vehicle information by receiving power from the supplemental battery 50.

In addition, the supplemental battery 50 has a capacity limit of current capacity. Therefore, in step S16, the main control unit 10 monitors a consumption of electric current of the supplemental battery 50 based on a signal from the monitoring unit 30 (a battery monitor in claims). In other words, the monitoring unit 30 accumulates a consumption of electric current, calculates the accumulated consumption of electric current, and outputs a signal showing the calculation result to the main control unit 10. That is, by accumulating the consumed current of the supplemental battery 50, the remaining amount of the supplemental battery 50 is monitored.

In step S17, whether the remaining amount of the supplemental battery 50 is OK or not is determined, that is, whether the remaining battery is above a threshold is determined. If the remaining amount is OK, the process returns to S15. If it is not OK, the process is concluded.

In addition, the supplemental battery 50 needs to have a smaller volume to be installed in the in-vehicle wireless communication apparatus 100. Thus, the current capacity limit of the battery 50 is lower in comparison to the main battery 200. Therefore, based on the monitor results of the consumption of electric current of the supplemental battery 50 in step S16, i.e., the remaining amount of the supplemental battery 50, the main control unit 10 may adjust information amount of the vehicle information (an information amount change unit in claims). For example, when the remaining amount of the supplemental battery 50 is relatively high, i.e., just after switching to the supplemental battery 50, the vehicle information may include the position information, the battery voltage drop information, an alarm signal, the camera image. Then, as the remaining battery amount decreases, the information amount of the vehicle information may be decreased to include only the position information.

In this manner, the information amount can be decreased as the remaining battery amount of the supplemental battery 50 is decreased. By decreasing the information amount, the battery consumption is also decreased. Thus, the information transmission time is decreased, thereby decreasing the battery consumption, and increasing the operation time of reporting function.

Figure 4:
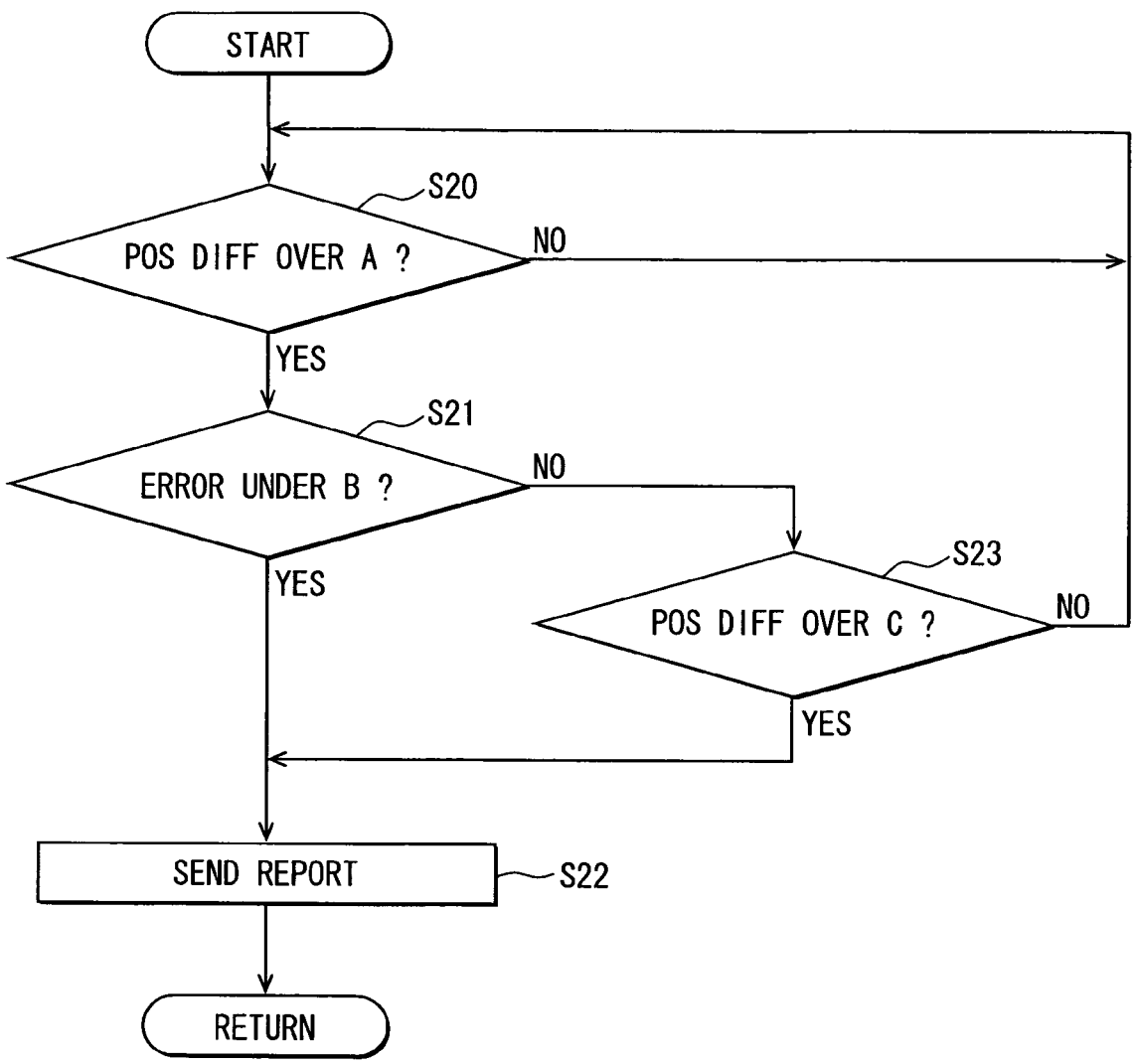
FIG. 4 is a flowchart of a process regarding a low battery consumption operation of the in-vehicle wireless communication apparatus in a modification example.
Figure 5:
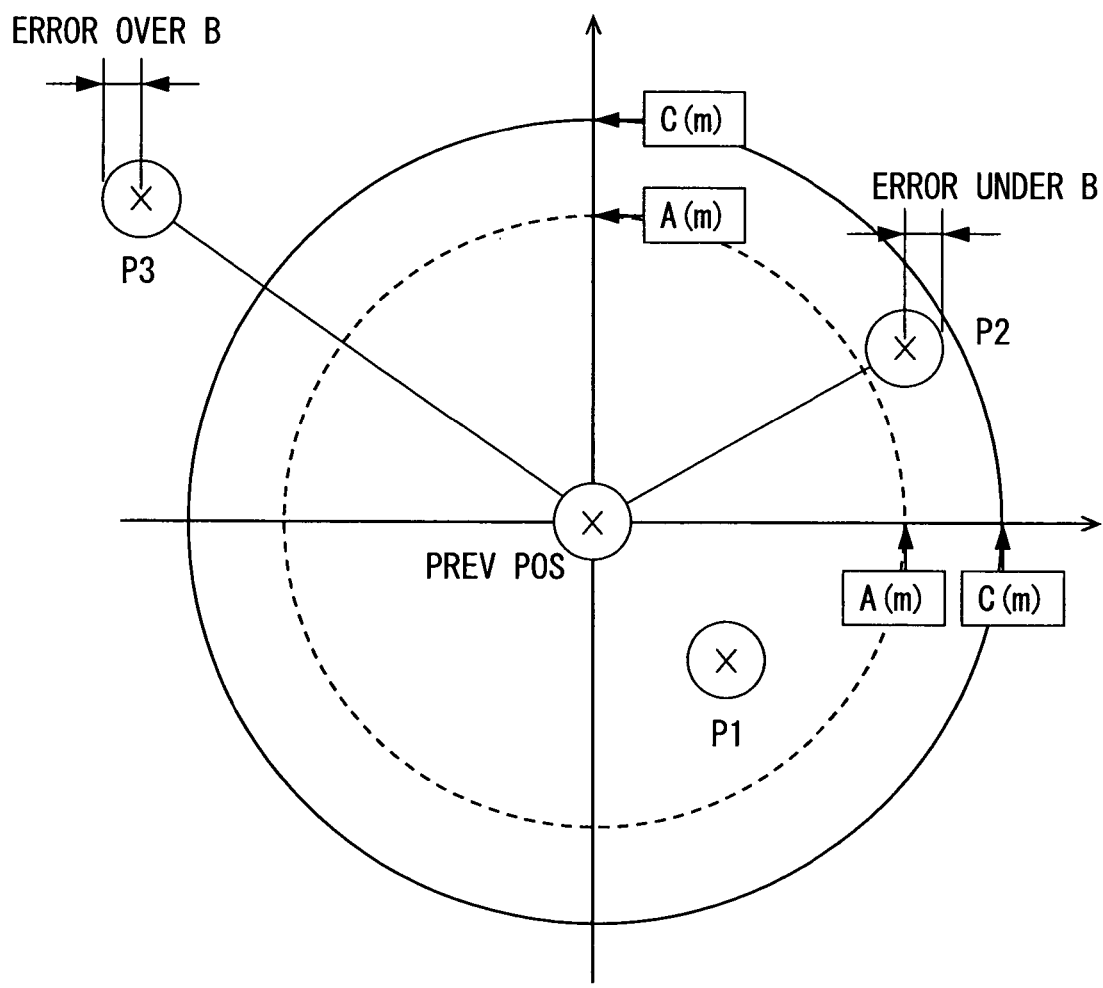
FIG. 5 is an illustration of the process regarding the low battery consumption operation of the in-vehicle wireless communication apparatus.

As a modification of the above embodiment, the reporting may be selectively performed for the purpose of decreasing the battery consumption. A low battery consumption GPS positioning process in a modification example is explained with reference to FIGS. 4 and 5. The process in FIG. 4 is started when the battery is switched from the main battery 200 to the supplemental battery 50, and is repeated at a regular interval. Further, in the modification example, the main control unit 10 memorizes the position information at a time of transmission preparation and at a time of reporting the vehicle information (a position storage in claims).

In step S20, the main control unit 10 determines whether a difference between the current position and the previous position is greater than A (m). That is, in other words, whether the distance from a previously memorized position of the vehicle to a currently acquired position of the vehicle is equal to or greater than A (m) is determined. If, for example, the currently acquired position is determined to be farther than A (m), as a GPS positioned point of P2 or P3 in FIG. 5, the process proceeds to S21. If it is not, that is, not farther than A (m), the process repeats S20.

If the vehicle information has not yet been transmitted after switching the battery to the supplemental battery 50, the previous vehicle position is based on the vehicle information memorized at a transmission preparation time. The previous vehicle position is, if the vehicle position has been once transmitted after switching the battery, based on the vehicle position included in the transmitted vehicle information.

In step S21, the main control unit 10 determines whether a positioning error is equal to or smaller than a tolerance B (m). If the error is equal to or smaller than the tolerance B (m), the process proceeds to step S22. If the error is greater than the tolerance B (m), the process proceeds to step S23. The reason for determining the error range is, that (a) the positioning by GPS satellites based on the transmitted GPS signal may have an error, (b) the error in the GPS positioning may lead to the inaccurate distance measurement, that is, the distance measurement greater than A (m) may not necessarily be correct, or, in other words, the distance may be smaller than A (m). Therefore, based on the above reasoning, even when it is suspected that the vehicle in a parked condition is stolen, the theft report is not configured to be transmitted solely on a condition that the difference between the previous vehicle position and the current vehicle position is equal to or greater than A (m).

Then, in step. S22, the main control unit 10 performs reporting by transmitting the prepared vehicle information in the register from the RF modulation demodulation unit 12 and the second antenna 12*a* to an outside of the vehicle (a report unit in claims), assuming that the distance between the previous vehicle position and the current vehicle position is greater than A (m) and the error is smaller than the tolerance B (m), as illustrated as a GPS positioned point P2 in FIG. 5.

In summary, reporting is performed only when the current vehicle position is distant from the previous vehicle position by a distance that is equal to or greater than a predetermined threshold and the positioning error is equal to or smaller than the tolerance. In this manner, the number of reporting can be decreased. That is, in other words, the power-on time of the RF modulation demodulation unit 12 (i.e., a power supply time) can be reduced. Therefore, the consumption of the supplemental battery 50 can be reduced, and the reporting time can be extended. As a result, tracking time for tracking the stolen vehicle can be extended.

On the other hand, in step S23, the main control unit 10 determines whether a difference between the previous vehicle position and the current vehicle position is equal to or greater than C (C>A+B). That is, whether the distance from the previously memorized vehicle position to the currently acquired vehicle position is equal to or greater than C (m) is determined. Then, in case that the current position is a point P3 in FIG. 5 or the like, which is, according to GPS positioning, distant from the previous position by the distance of C (m) or farther, the process proceeds to S22. If the current position is not distant from the previous position by more than C (m), the process returns to S20. In other words, even when the positioning error is not equal to or smaller than B (m), reporting is performed if the current vehicle position is distant from the previous vehicle position by the distance of A (m) plus of B (m) or more.

In this manner, the reporting can be preferably performed even when the vehicle position includes the positioning error.

For the convenience of maintenance and repair work, which is accompanied by the removal of main battery 200 from the vehicle, the switching from the main battery 200 to the supplemental battery 50 may be cancelled remotely through wireless communication, by, for example, sending notification in advance to the management center 300, or dealer and store 400 (switching cancel unit in claims).

Although the present disclosure has been fully described in connection with preferred embodiment thereof with reference to the accompanying drawings, it is to be noted that various changes and modifications will become apparent to those skilled in the art.

For example, the first antenna 11a and the second antenna 12a described as separate in the above embodiment may be integrally disposed in one body, and communication between the management center 300 and the dealer 400 may be provided by various communication methods.

Further, cancellation of battery switching in the vehicle at the dealer 400 or other places for the purpose of vehicle maintenance may be manually or automatically controlled, based on the vehicle position determined by the GPS positioning or other method.

Such changes, modifications, and summarized schemes are to be understood as being within the scope of the present disclosure as defined by appended claims.

What is claimed is:

1. A vehicle communication apparatus for use in a vehicle with a power supply from a vehicle battery, the apparatus comprising:

a position acquisition unit for acquiring a vehicle position;
a voltage monitor for monitoring a voltage of the vehicle battery;
a supplemental battery for supplying power in place of the vehicle battery;
a check unit for checking if the vehicle battery is removed upon detecting that the voltage of the battery reaches a threshold;
a power switch unit for switching the power supply from the vehicle battery to the power supply from the supplemental battery when the check unit determines that the vehicle battery is removed;
a report unit for transmitting, to an outside of the vehicle, an information report that at least includes the vehicle position when the check unit determines that the vehicle battery is removed; and
a preparation unit for preparing the report information that is to be transmitted by the report unit when the voltage of the vehicle battery decreases to a preparation value that is higher than the threshold.

2. The vehicle communication apparatus of claim 1 further comprising:

a positioning unit for positioning the vehicle;
an error acquisition unit for acquiring an error of the positioning unit; and
a position storage for storing the vehicle position at a time of transmission of the report information by the report unit and the vehicle position at a time of preparation of the report information by the preparation unit, wherein
the position acquisition unit acquires the vehicle position from the positioning unit,
the report unit transmits the report information if a positional difference between a current vehicle position and a previous vehicle position respectively acquired by the position acquisition unit is equal to or greater than a preset value and the error of the positioning unit is equal to or smaller than a tolerance, and
the report unit otherwise does not transmit the report information.

3. The vehicle communication apparatus of claim 2, wherein
the report unit transmits the report information if, even when the error of the positioning unit is not equal to or smaller than the tolerance, the positional difference is equal to or greater than a total of the preset value and the tolerance of the error of the positioning unit.

4. The vehicle communication apparatus of claim 1 further comprising:

a battery monitor for monitoring a remaining amount of the supplemental battery; and
an information amount change unit for changing an information amount of the report information according to the remaining amount of the supplemental battery.

5. The vehicle communication apparatus of claim 1 further comprising:

a switching cancel unit for canceling the battery switching to the supplemental battery by the power switch unit even when the check unit determines that the vehicle battery is removed.

* * * * *